(12) United States Patent
Nosch

(10) Patent No.: US 6,189,675 B1
(45) Date of Patent: Feb. 20, 2001

(54) APPARATUS FOR ORIENTING CONTAINERS

(75) Inventor: Theodore Nosch, Saddle Brook, NJ (US)

(73) Assignee: Ganz Brothers, Inc., Bergenfield, NJ (US)

( * ) Notice: Under 35 U.S.C. 154(b), the term of this patent shall be extended for 0 days.

(21) Appl. No.: 09/135,677

(22) Filed: Aug. 18, 1998

Related U.S. Application Data

(60) Provisional application No. 60/055,945, filed on Aug. 18, 1997.

(51) Int. Cl.$^7$ .......................... B65G 17/32; B65G 47/24; B65G 37/00
(52) U.S. Cl. .......................... 198/394; 198/415; 198/570
(58) Field of Search .................................. 198/415, 394, 198/570

(56) References Cited

U.S. PATENT DOCUMENTS

| 2,543,142 | * | 2/1951 | Wehmiller et al. | ............... 198/415 |
| 3,169,629 | * | 2/1965 | Randrup | ........................ 198/394 |

* cited by examiner

Primary Examiner—Robert P. Olszewski
Assistant Examiner—Bryan Jaketic
(74) Attorney, Agent, or Firm—William H. Holt

(57) ABSTRACT

Method and apparatus for orienting a container, or plurality thereof, incident to a packaging operation by engaging the container with an elongate driven member travelling at a different speed than the container along a conveyor or assembly line. In particular, the containers may have the shape of a petaloid bottle, for beverages and the like, and the bottles are rotated into a common position to conform to requirements of the carton, carrier or other packaging material.

4 Claims, 2 Drawing Sheets

APPARATUS FOR ORIENTING CONTAINERS

This application claims the benefit of U.S. Provisional Ser. No. 60/055,945 filed Aug. 18, 1997.

BACKGROUND OF THE INVENTION

The invention relates to the handling of containers in the form of bottles such as blow molded plastic bottles which are currently used for packaging liquid or powdered products. Examples of such bottled products are beverages including cola drinks, water, fruit juices, beer, wine, or powder and the like. One style of a commercially popular container is known as a "petaloid" bottle because its base portion is provided with a plurality of enlargements which are shaped somewhat like the petals of a flower.

These bottled products are traditionally marketed in packages either singly or containing a multiple number of containers such as a six-pack, a four-pack, a two-pack, and the like, and are assembled together by automatic handling equipment and usually enclosed within a paperboard carton or sleeve that is wrapped around the containers and locked in place by suitable tabs, openings or other forms of locking devices. It is understood though that a package may consist of a single container. In all instances, it is desired that the orientation of the bottom petal portions be controlled in conformance with package requirements.

SUMMARY OF THE INVENTION

The invention relates to method and apparatus for use in a conveyor or assembly line for orienting a container or containers and, more particularly, for aligning a series of such containers having configured bottoms so that all of the bottoms are oriented in precise positions to cooperate with portions of packaging materials such as carriers in the form of cartons and the like, the latter (not shown) being conventionally constructed of paperboard, or plastic in the form of a wrap-a-round member or a shrink wrap, and the like, and having suitable cut-out portions and/or tabs for securing the containers therein.

DESCRIPTION OF THE PREFERRED EMBODIMENTS

Figure 2:
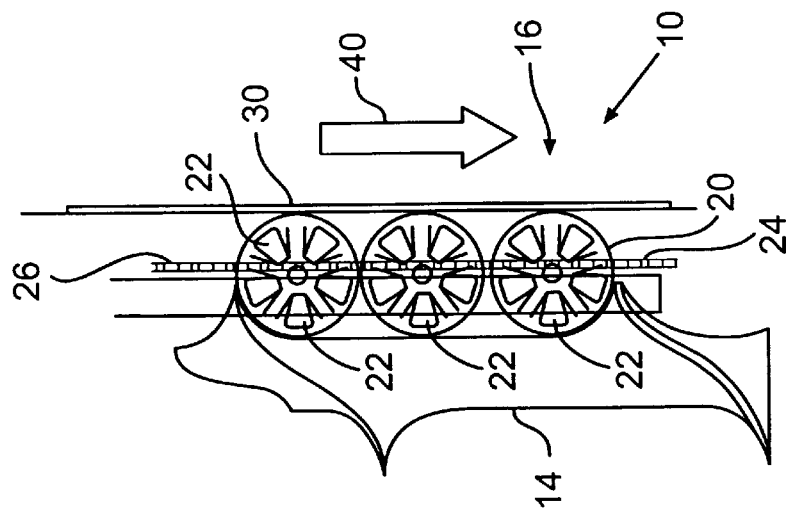
FIG. 2 shows a fragmentary bottom view of a portion of the assembly line showing part of a helical feed screw and a portion of an endless chain member for orienting the petals on the bottom portions of a series of containers.
Figure 1:
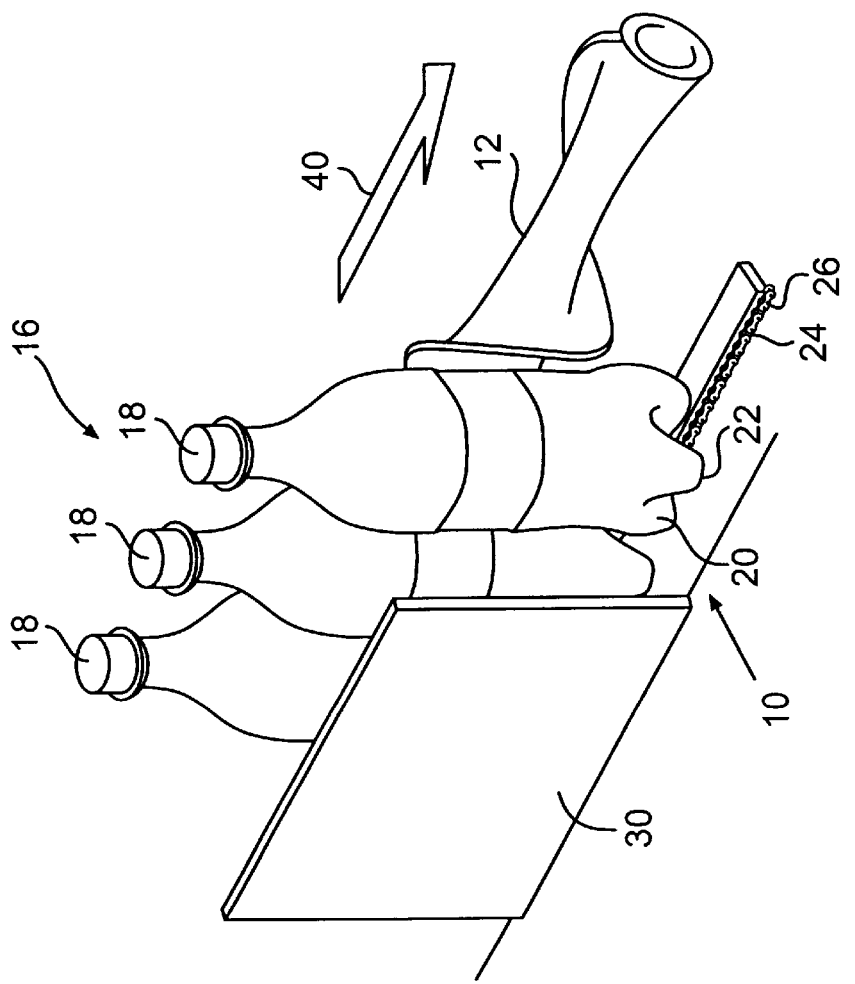
FIG. 1 shows a fragmentary perspective view of a conveyor mechanism forming part of an assembly line for aligning a plurality of bottles having petaloid bottoms so their bases are in common alignment prior to being bundled into a multi-pack carton or carrier.
Figure 3:
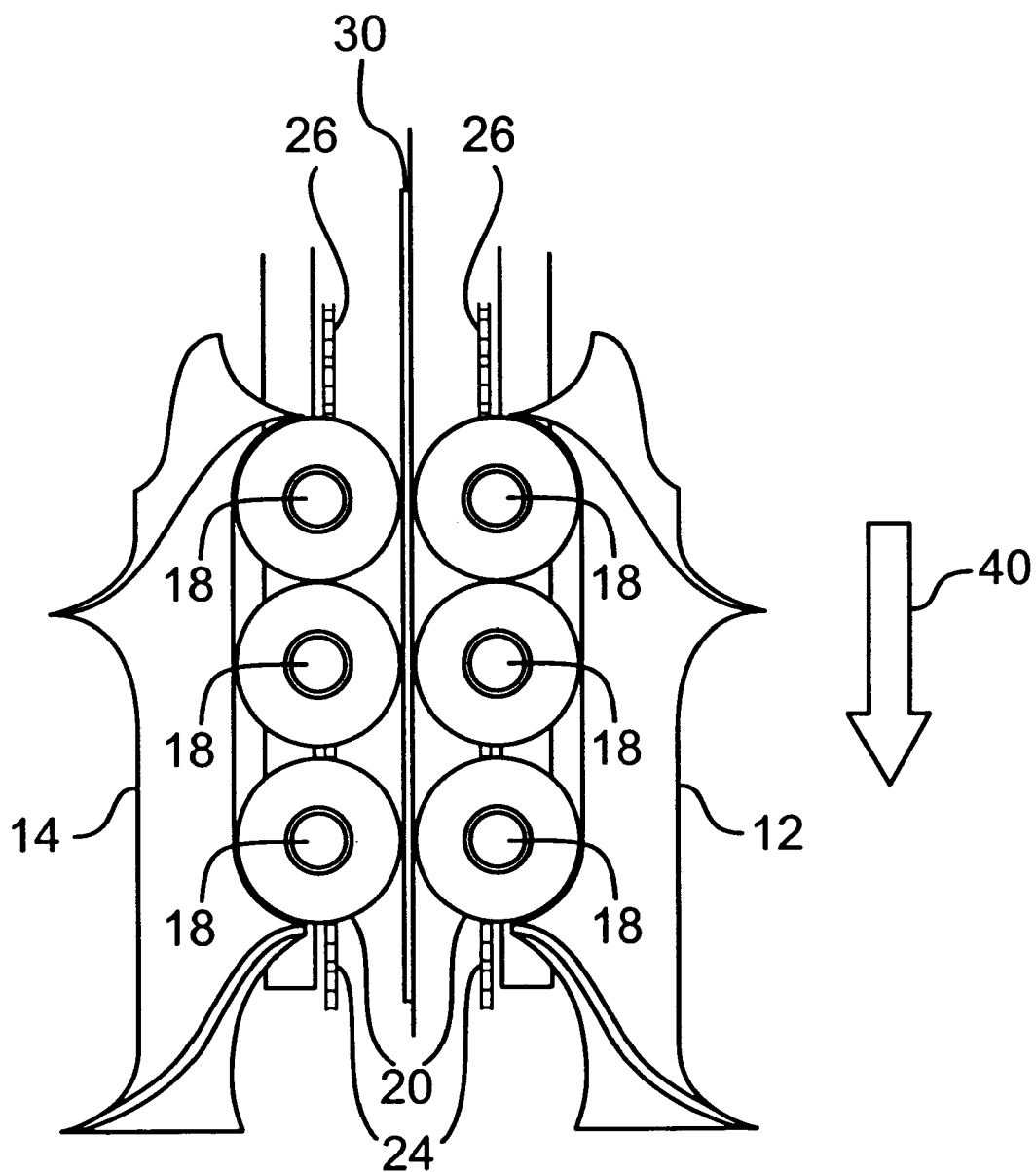
FIG. 3 is a plan view showing a pair of rotatable screw members for moving a series of containers in parallel rows along the conveyor line.

FIGS. 1 and 2 illustrate a conveyor or packaging line, generally indicated by the numeral 10, including a pair of helical screw members 12 and 14 for side-by-side rows 16 of a plurality of containers, shown as being a series of three bottles 18, which are being moved along the conveyor or packaging line 10 and will eventually become a package of six containers, i.e., a "six-pack". Of course it is to be understood that packages of a single bottle, or a plurality of bottles can be grouped together depending upon the size and shape of screw members 12 and 14.

The bottles 18 are shown as having bottom portions 20 shaped in a form known as a petaloid bottom having a series of petal shapes 22 for providing the bottle 18 with stability and with strength for withstanding internal pressures created during filling with beverages and the like. Associated with each row 16 is an elongate member 24 preferably in the form of an endless chain 26 that is to be driven by a drive motor, sprocket and suitable pulleys (not shown). The chain 26 engages the bottom portions 20 of the respective bottles 18 and causes the bottles to rotate generally about a vertical axis to a position in which all of the petal shapes 22 are oriented in a similar or symmetrical fashion (see FIG. 2). As a result, openings provided in the paperboard cartons or sleeves (not shown) can snugly receive the petals 22 so that the bottles 18 are held in stable position during loading, transportation, and subsequent display for marketing purposes with minimal damage or mishandling.

Conveyor line 10 includes a center divider member 30 for maintaining a separation between adjacent rows of bottles 18 to preclude interference therebetween and to aid in keeping the bottles from tipping over or falling from the conveyor line 10 during movement therealong. Divider member 30 extends along a center line 32 at least for a length of line 20 which includes screw members 12 and 14. In the embodiment shown, each screw member 12 and 14 moves the series of three bottles 18 so that six bottles arrive simultaneously at a packaging or wrapping station (not shown).

As the bottles 18 move along the conveyor line 10, their bottom portions 20 come into contact with the endless chain 24. The chain 26 is driven at a faster speed than the speed of the bottles 18 as they move in the direction of the arrows 40. As a result, engagement of chain 26 with the petal shapes 22 cause the bottles 18 to rotate to a position best shown in FIG. 2 with the petal shapes 22 all being aligned in the same fashion. Thus, the bottles are pre-aligned for accurate engagement with openings, tabs, etc., in the packaging or wrapping material.

While the invention has been shown and described herein in what is believed to be the most practical and preferred mode, it is to be understood that variations and modifications may be made without departing from the spirit and scope of the invention as defined in the appended claimed subject matter.

I claim:

1. Apparatus for orienting containers, said apparatus comprising a conveyor line including means for moving containers along said line, orienting means disposed along said line in position to engage the containers, said orienting means moving at a speed different from the moving containers for causing rotation of the containers to a predetermined orientation and including a pair of rotatable screw members for moving a series of containers in parallel rows along said conveyor line.

2. Apparatus as defined in claim 1 wherein said orienting means comprises a driven chain member.

3. Apparatus for orienting containers, said apparatus comprising a conveyor line including means for moving containers along said line, orienting means disposed along said line in position to engage the containers, said orienting means moving at a speed different from the moving containers for causing rotation of the containers to a predetermined orientation, including a pair of rotatable screw members for moving a series of containers in parallel rows along said conveyor line and including a center divider member extending along said conveyor line and cooperating with said screw members for controlling movement of the container.

4. Apparatus as defined in claim 3 wherein said orienting means comprises a driven chain member.

* * * * *